United States Patent [19]

Itoh et al.

[11] Patent Number: 5,519,306

[45] Date of Patent: May 21, 1996

[54] CONSTANT VOLTAGE CIRCUIT AND A STABILIZED POWER SUPPLY UNIT

[75] Inventors: Koichi Itoh; Haruo Kumada, both of Kanagawa, Japan

[73] Assignee: Yutaka Electric Mfg. Co., Ltd., Kanagawa, Japan

[21] Appl. No.: 235,313

[22] Filed: Apr. 29, 1994

[30] Foreign Application Priority Data

Mar. 2, 1994 [JP] Japan .................................. 6-056667

[51] Int. Cl.[6] .............................. G05F 1/70; G05F 1/565
[52] U.S. Cl. ......................... 323/222; 323/207; 363/132; 363/26
[58] Field of Search .................................. 363/16–17, 98, 363/124, 132, 56, 63; 323/222, 224, 266, 268, 271, 272; 307/44, 48, 66, 85–87

[56] References Cited

U.S. PATENT DOCUMENTS 4,823,247   4/1989   Tamoto ..................... 363/16

FOREIGN PATENT DOCUMENTS 111246   4/1993   Japan .

Primary Examiner—Peter S. Wong
Assistant Examiner—Aditya Krishnan
Attorney, Agent, or Firm—Lowe, Price, LeBlanc & Becker

[57] ABSTRACT

A DC constant voltage circuit comprises a rectifier and a boosting chopper circuit controlled by a general purpose PWM control IC. The general purpose PWM control IC receives a reference voltage Vref which regulates the output voltage by pulse width modulation and produces a voltage having the same waveform and phase as the input current to improve the power factor of the output voltage. An AC constant voltage circuit comprises a common line connecting an AC input terminal and an output terminal, positive and negative boosting chopper circuits for boosting and chopping a half-wave rectified respectively in both positive and negative sides into a DC voltage and a DC-AC inverter for inverting the DC voltage into the AC output voltage. The positive and negative boosting chopper circuits are used as a filter for improving the power factor and adjusting the waveform and phase of the output voltage to be the same as the sine full waveform of the input voltage.

10 Claims, 17 Drawing Sheets

Fig. 10(a) Full Wave Rectification Voltage
Fig. 10(b) Ripple Voltage
Fig. 10(c) Amp 73(+)
Fig. 10(d) Amp 73(-)
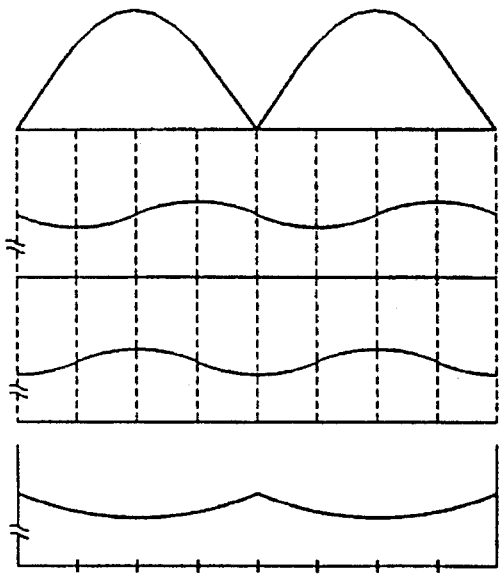
Fig. 10(e) Comparator 75(-)
Fig. 10(f) Comparator 75(+)
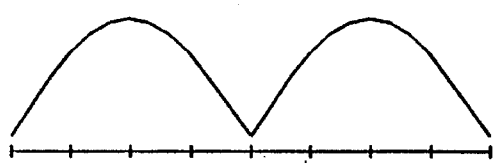
Fig. 10(g) PWM output (Vgs of FET25)
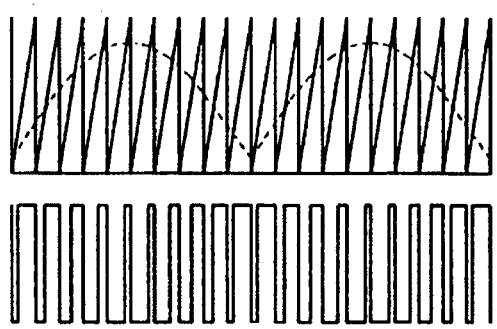
Fig. 10(h) Current i (Resistor 60)
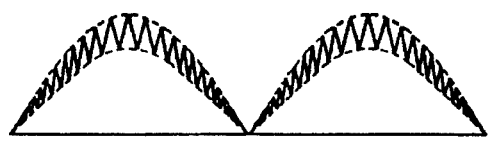

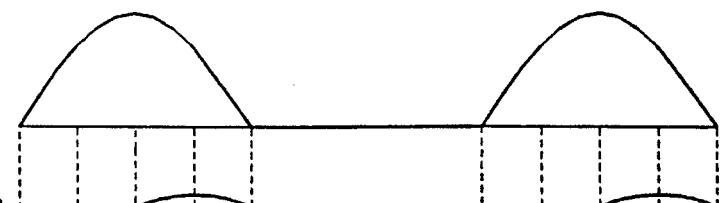
Fig. 15(a) Half Wave Rectification Voltage
Fig. 15(b) Ripple Voltage
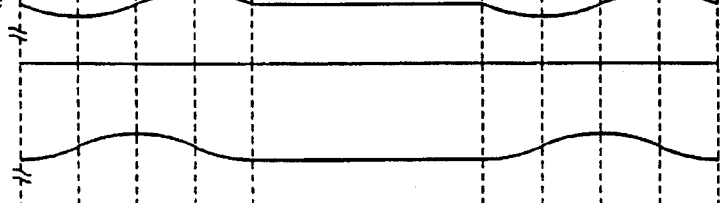
Fig. 15(c) Amp 73(+)
Fig. 15(d) Amp 73(−)
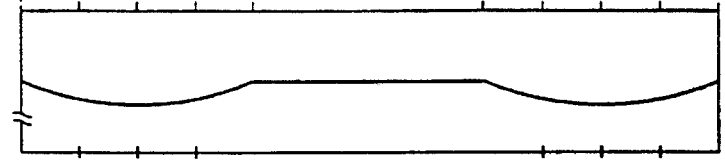
Fig. 15(e) Comparator 75(−)
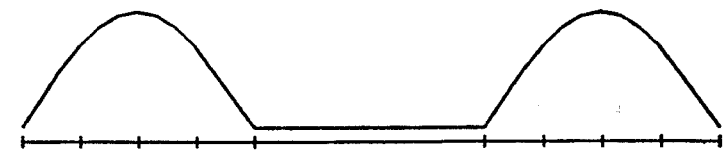
Fig. 15(f) Comparator 75(+)
Fig. 15(g) PWM output (Vgs of FET25)
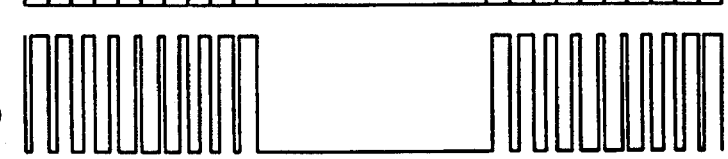
Fig. 15(h) Current i (Resistor 72)

CONSTANT VOLTAGE CIRCUIT AND A STABILIZED POWER SUPPLY UNIT

BACKGROUND OF THE INVENTION

(1) Field of the Invention

The present invention relates to the capacitor input type constant voltage circuit and the switching power supply unit using said constant voltage circuit. Also, the present invention relates to the stabilized power supply unit for half wave rectifying the AC input power respectively in both positive and negative sides and then reinverting said DC into the AC.

(2) Description of the Prior Art

Generally, the capacitor input type full-wave rectification circuit is designed as shown in FIG. 1.

The AC power supply 10 is rectified by the bridge type full wave rectification circuit 11 and smoothed by the capacitor 19 for being the DC voltage to be supplied with the load 6, such as the switching power supply.

In the circuit of described above, the rectification voltage inputted into the capacitor 19 generates the sine full waveform as shown in FIG. 2(a). Said voltage creates the ripple voltage waveform when smoothed by the capaciter 19. The current inputted into said capacitor 19 flows only when the voltage of the capacitor 19 is lowered. The waveform of said current comprises narrow duty cycle, high peak and the peak value as shown in FIG. 2(b), though the waveform of the input voltage is the sine wave. Thus, the power factor of said current remains as low as 0.5.

T he power factor improvement circuit has been used conventionally for solving the problems as described above.

In the DC constant voltage circuit comprising the boosting chopper circuit 31 shown in FIG. 3, the PWM controlling IC 48 for the power factor improvement is conventionally used as the IC for constant voltage and power factor improvement. The detailed explanation of said IC 48 is shown in FIG. 4.

A DETAILED EXPLANATION IS

In FIG. 3, the AC power supply 10 is connected to the input side of the full wave rectifier 11, the boosting chopper circuit 31, the capaciter 29 and the load 6 are connected to the output side of said rectifier 11. The boosting chopper circuit 31 comprises inductor 23, diode 27, switching element(such as MOSFET) 25, capaciter 29 and said IC 48.

The +output side of said rectifier 11 is connected to No.6 pin of said IC 48 through the resistor 49 and connected to No. 8 pin through the integration circuit 5. The integration circuit 5 comprises resistor 50 and capaciter 53..

Resistor 4 is inserted into the −output side of said rectifier 11, the rectifier 11 side of said resistor 4 is connected to No.5 pin and the +side of said capaciter 29 is connected with No.11 pin. No.16 pin which is the PWM output terminal of said IC 48 is connected to the gate of said switching element 25.

The power factor improvement is made possible by creating a waveform of input current similar to that of input voltage.

In the circuit in FIG. 3, the waveform of input voltage is detected, as signals required for improving the power factor, by resistor 49, the effective input voltage by the integration circuit 5, the waveform of the input current by resistor 4 and the output voltage by capaciter 29 respectively. The power factor is made possible when these signals are inputted into and controlled at the same time No. 6 pin, No. 8 pin, No. 5 pin and No. 11 pin respectively.

The prior art for improving power factor with said IC 48 is controlled complicately and has to connect a large number of parts around said IC 48, so there has been the problem such that the circuit is designed complicately and to be expensive costs.

The applicant has already filed the stabilized power supply unit of the AC constant voltage in which one side of the AC input terminal and one side of output terminal are connected as a common line, as shown in FIG. 6 (U.S. Pat. No. 4,823,247).

In FIG. 6, the voltage Vi of the AC power supply 10 as shown in FIG. 7(b) is applied between the AC input terminals 2 and 3. The AC voltage is half wave rectified at both positive and negative sides of voltage multiplication rectifier and smoothed by capaciters 19 and 20 to obtain DC voltages +V1 and −V2. Said +V1 and −V2 are equal on the positive side (described with the solid line) and negative side (described with the dotted line) with respect to the common line 16 (shown in FIG. 7(b)). The voltages +V1 and −V2 are chopped by the transistors 25 and 26 of the boosting chopper circuits 31 and 32 to obtain +V3 and −V4 which are higher than +V1 and −V2 at both ends of the capaciters 25 and 26 (as shown in FIG. 7(d)).

In this FIG. 7(d), the period t=1/f(f≧20 k/Hz) and the areas m and n marked are equal (t1=ON -time of the transistor 25). In other words, the controlling circuits 43 and 44 detect +V3 and −V4 when they increased, control so that reduce ON time t1 of the transistors 25 and 26 be with drive circuits 41 and 42, whereas said circuits 43 and 44 control to increase said ON time t1 when +V3 and −V4 lower.

The pulse voltage shown in FIG. 7(d) is smoothed by the rectifiers 27 and 2B and the capaciters 29 and 30 to be transmitted to DC AC inverter 37. Transistors 33 and 34 of said DC-AC inverter 37 become ON and OFF alternatively and the ON time and OFF time correspond the AC output waveform respectively to produce the pulse voltage waveform V5 (as described with the solid line in FIG. 7(e)). This V5 after harmonic wave component through filter circuit 96 which is composed of inductor 35 and capaciter 36, becomes AC output voltage V0 (as described with the dotted line in FIG. 7(d)).

When the AC voltage input is interrupted due to power, DC voltages of the batteries 38a and 38b are transmitted to boosting chopper circuits 31 and 32 respectively through diodes 39 and 40. The actions after boosting chopper circuits 31 and 32 are the same as previously explained.

DC output voltage settings of batteries 38a and 38b are to be slightly lower than said +V1 and −V2.

When the excessive load current flows due to unexpected causes, load current detection circuit 13 and the output voltage detection circuit 12 detect such are current, switch the contactor of change over circuit 14 to the direct supply line 1 side, AC power directly to load 6 through AC input terminal 2 and direct supply line 1. In this case, the other input terminal and output terminal 9 are connected by a common line 16, and there is no problem.

Batteries 38a and 38b are charged when the AC voltage is inputted by the charging circuit which is not shown.

The problem concerning the circuit shown in FIG. 6 is explained by using block diagram 5. In FIG. 5, the voltage rectified by diodes 17 and 18 of voltage multiplication rectifier 21 is the half wave rectification and voltage smoothed by capaciters 19 and 20 is DC voltage coupled with commercial ripple voltages (with solid and dotted lines in FIG. 7(b)).

However, the current inputted into capaciters 19 and 20 flows only when voltages of said capaciters 19 and 20 lower.

This current generates waveforms comprising the nallow duty cycle, high peak and high peak value, though input voltage is sine wave. Thus, power factor becomes around 0.5. In the AC constant voltage circuit comprising common line 16 connecting AC input terminal 3 and output terminal 9, positive and negative boosting chopper circuits 31 and 32 boosting and chopping DC voltage of half rectificated respectively in each positive and negative sides and the DC-AC inverter 37 inverting said DC voltages into the AC, there has not been the circuit improved power factor in the prior art.

In DC constant voltage circuit with rectifier 11 and boosting chopper circuit 31 which is controlled by general purpose PWM control IC 48, as shown in FIG. 1 through FIG. 4, power factor has been obtained by said IC 48 which is used exclusively for the power factor improvement.

BRIEF SUMMARY OF THE INVENTION

The first object of this invention is to obtain inexpensive circuit which enables output voltage control and power factor improvement, in DC constant voltage circuit comprising the rectifier 11 and boosting chopper circuit 31 which is controlled by general purpose PWM control IC 48 which is used exclusively for the power factor improvement.

The second object of this invention is to obtain a switching power supply circuit using said DC constant voltage circuit with improved power factor.

The third object of this invention is to obtain the stabilized power supply circuit of constant DC voltage of simple circuit structure which enables improved power factor without changing basics circuit, in AC voltage regulation circuit which has a common line connecting AC input terminal 3 and output terminal 9, positive and negative boosting chopper circuits 31 and 32 for boosting and chopping DC voltage of half rectificated in positive and negative sides independently and the DC-AC inverter 37 for converting said DC voltages into AC voltage.

The fourth object of this invention is to obtain an uninterruptible stabilized power supply circuit which has constant AC voltage with improved power factor.

These and other objects of the invention will become more apparent in the detailed description and example which follow.

BRIEF DESCRIPTION OF THE DRAWINGS

FIG. 10(a)-10(h) waveforms at locations in FIG. 8.

FIG. 15(a)-15(h) shows waveforms at locations in FIG. 12.

DETAILED DESCRIPTION

Figure 8:
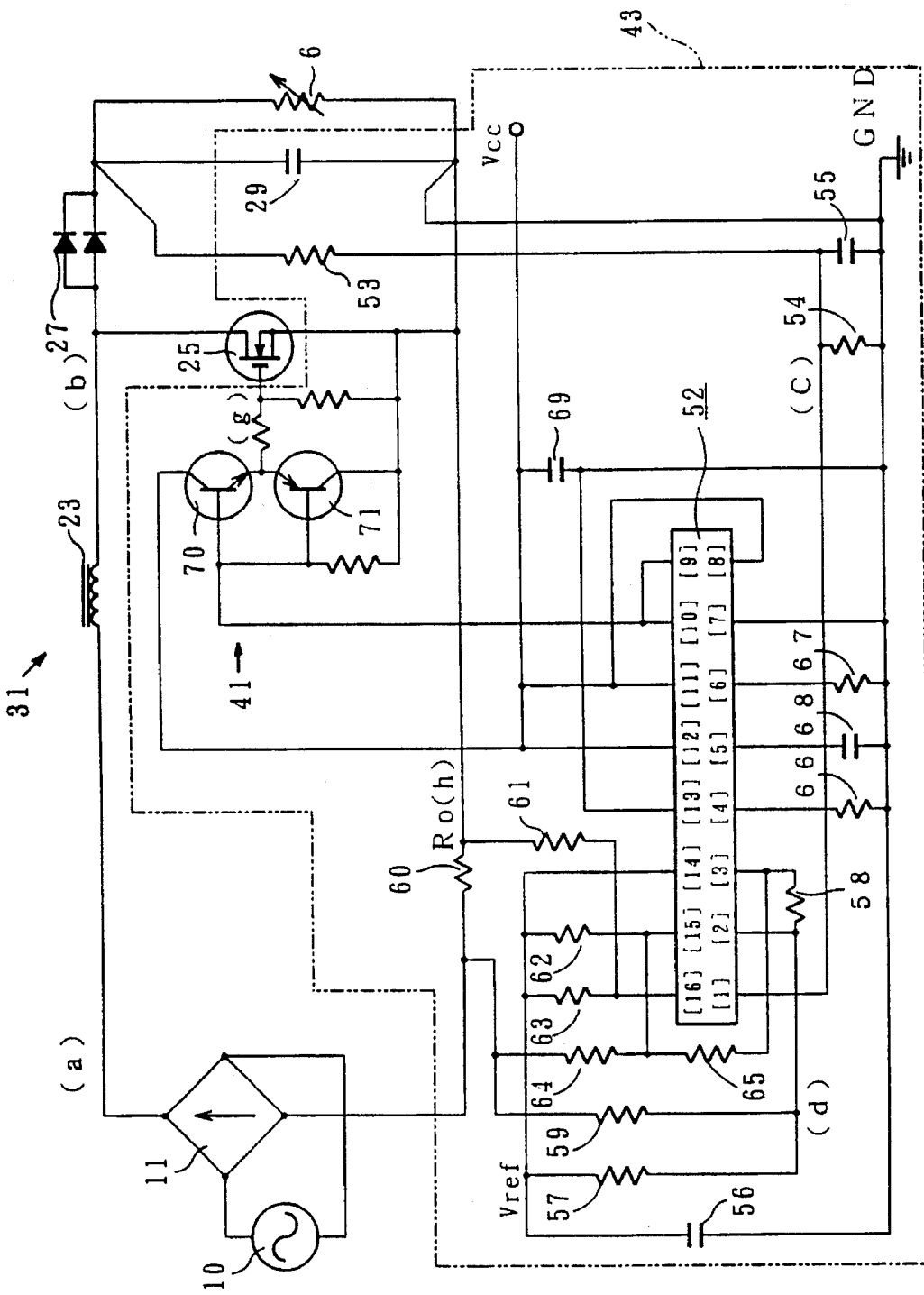
FIG. 8 is an electric diagram of the constant DC voltage circuit by this invention.
Figure 11:
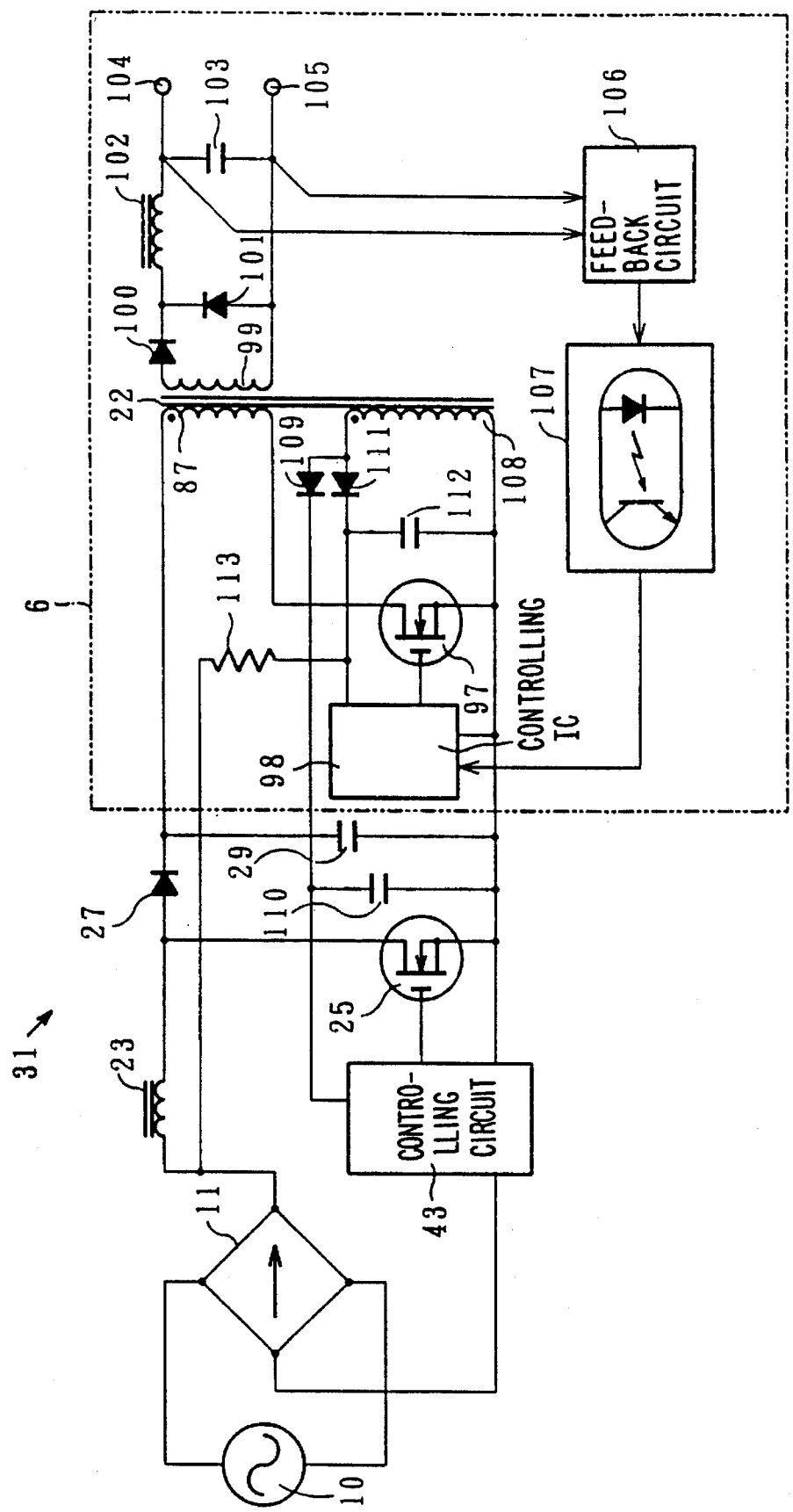
FIG. 11 is diagram of switching power supply circuit using constant DC voltage circuit designed by this invention.

FIG. 8 shows DC constant voltage circuit with improved power factor, and FIG. 11 shows switching power supply circuit using constant DC voltage circuit improved the power factor. The basic principle of this invention is explained as follows.

Active filter for power factor improvement has three kinds of devices such as inductance device, switching device and diode just like boosting chopper circuit.

This invention is designed to enable simultaneous voltage boosting and power factor improvement with a few added circuit s by utilizing boosting chopper circuit and active filter for the power factor improvement.

Figure 1:
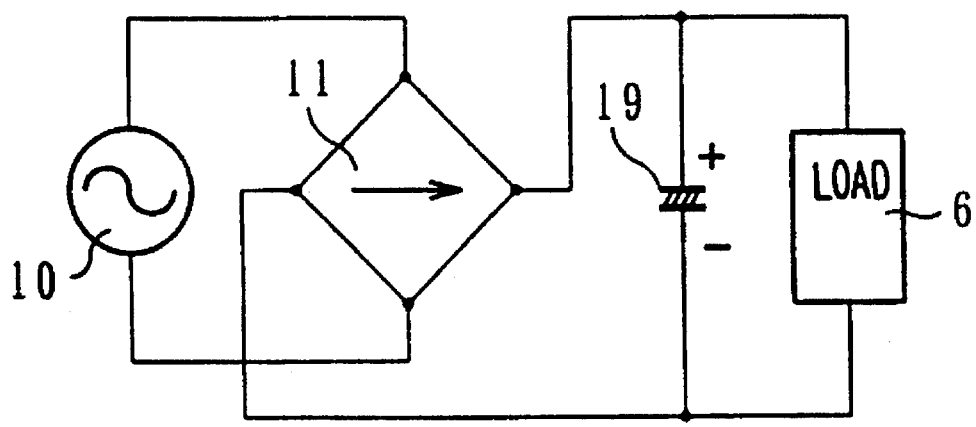
FIG. 1 is an electric circuit diagram showing the capacitor input type full wave rectifier.
Figure 2:
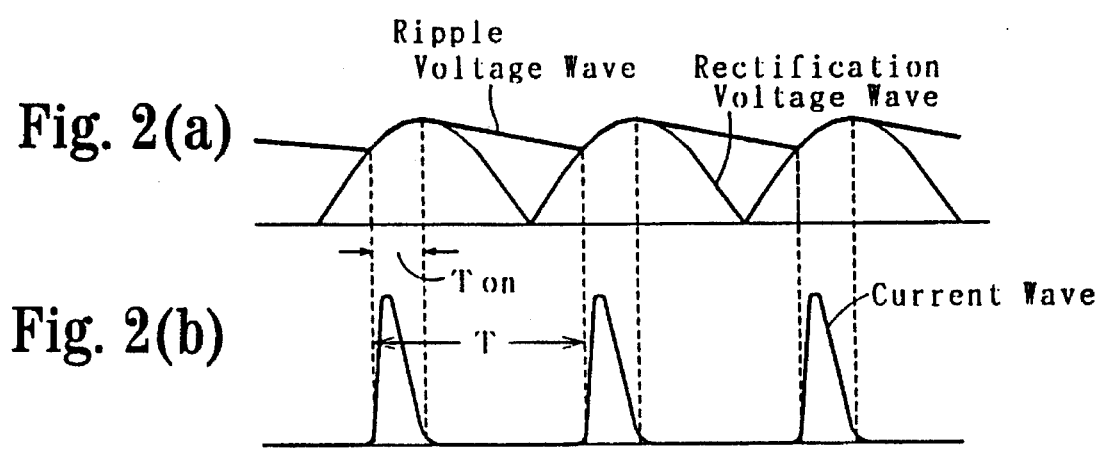
FIG. 2(a)-2(b) show a waveform of current and voltage in FIG. 1.
Figure 3:
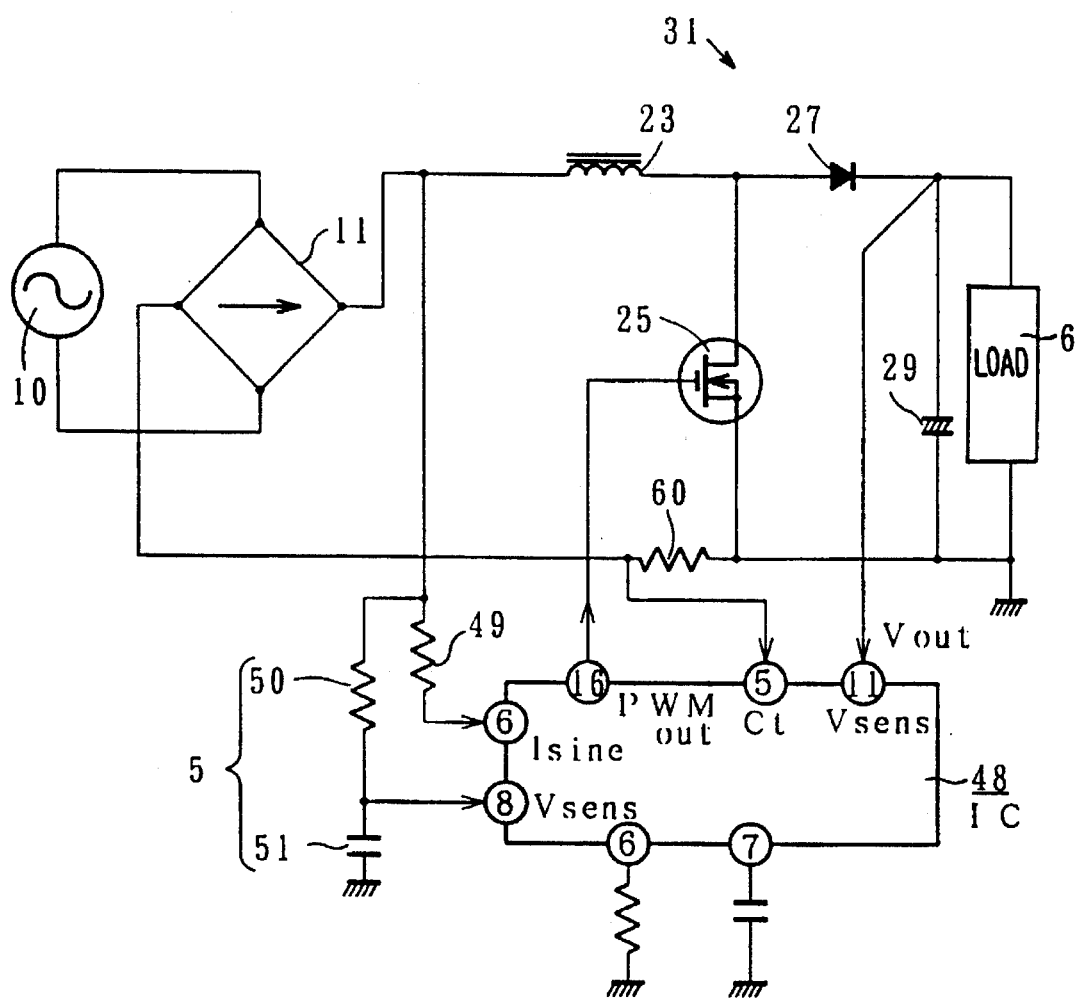
FIG. 3 is an electric circuit diagram of previous constant DC voltage circuit with improved power factor with comprising the boosting chopper circuit 31 controlled by general purpose power factor improvement PWM control IC 48.
Figure 4:
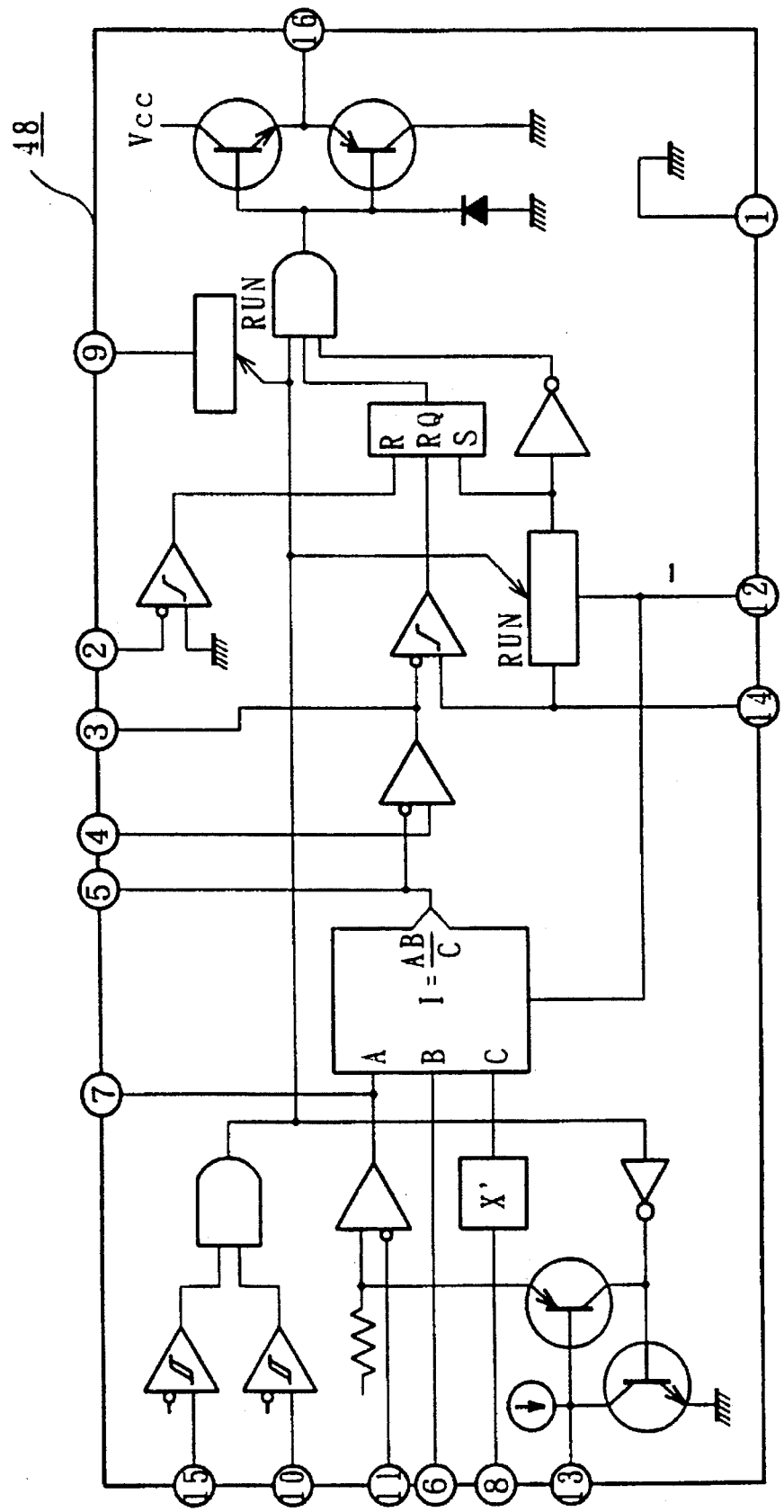
FIG. 4 is a block diagram of IC 48 in the circuit in FIG. 3
Figure 5:
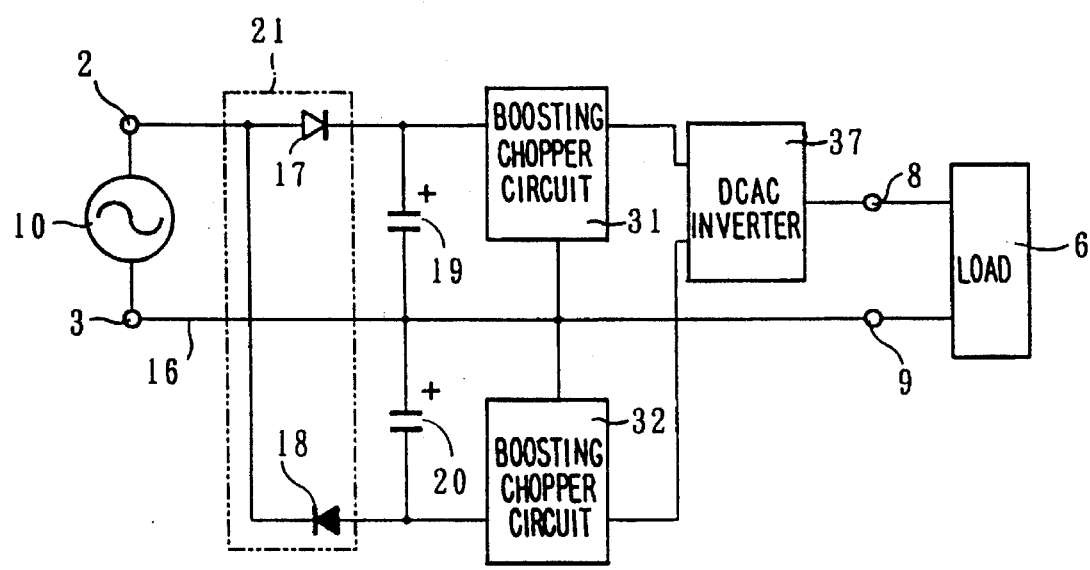
FIG. 5 is an electric diagram of the previous constant AC voltage circuit comprising common line 16 connecting AC input terminal 3 and output terminal 9, positive boosting chopping circuit 31 and negative circuit 32 for independently boosting and chopping DC voltage of half rectified into AC in positive and negative sides and DC-AC invert 37.

The detailed explanation follows. DC constant voltage circuit in FIG. 8, like in FIG. 3, AC power 10 is connected to input side of bridge type full wave rectifier 11. The boosting chopper circuit 31 and load 6 are connected successively to output side of said rectifier 11. Said boosting chopper circuit 31 is composed of inductor 23, diode 27 and switching device (such as MOSFET) 25.

Prior constant voltage circuit which uses said IC 48 improve for power factor has improved the power factor by four input signals which are input voltage waveform, effective input voltage, input current waveform and output voltage.

Meanwhile, in a DC constant voltage circuit in this invention, power factor improvement is made possible only by input current waveform and output voltage by utilizing general purpose PWM control IC 52.

Figure 9:
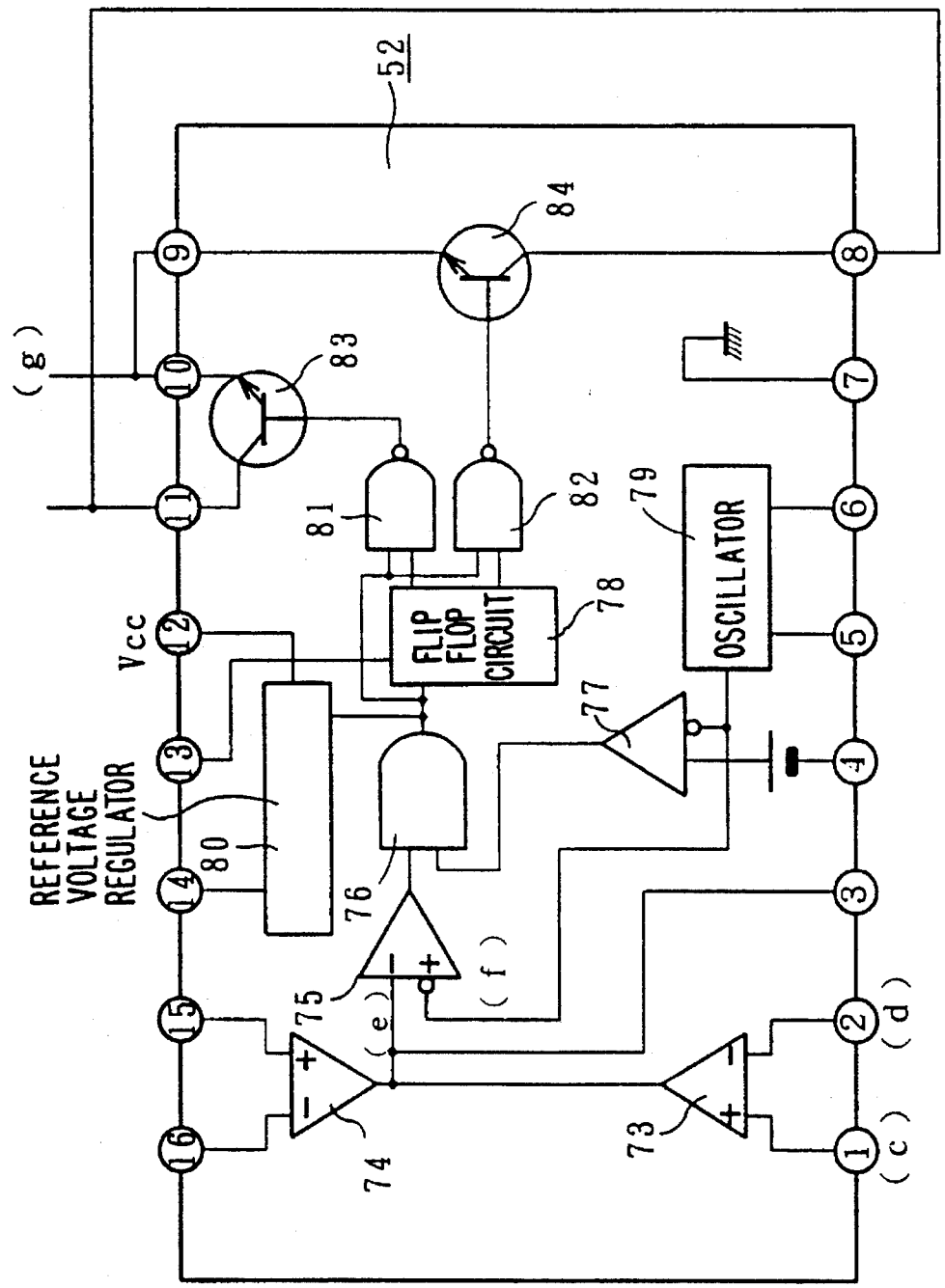
FIG. 9 is a block diagram of general purpose PWM control 52 used in the circuit in FIG, 8.

Said IC 52 as shown in FIG. 9 is composed of first noninverting error amplifier 73, second noninverting error amplifier 74, comparator 75, "and" circuit 76, inverter circuit 77, flipflop circuit 78, the oscillator 79, reference voltage regulator 80, "hand" circuits 81 and 82 and transistors 83 and 84. Pins 1 through 16 are input and output terminals.

In FIG. 8, the series circuit of the deriding resistors 53 and 54 are connected to each end of said capacitor 29 and the phase-adjusting capacitor 55 for is inserted in parallel with resistor 54. Input current detecting resistor 60 is inserted between said rectifier 1 and ground of load 6 and this resistor 60 is connected to No.2 pin (−input terminal) through resistor 59. No. 14 pin (reference voltage Vref) is connected to said No. 2 pin through resistor 57 and then connected to No. 3 pin through resistor 58.

Numbers 61, 62, 63, 64, 65, 66 and 67 are resistors and numbers 56, 68 and 69 are capacitors. Number 41 is the drive circuit comprising the transistors 70 and The actions in the structure as described above are explained as follows. AC power 10 is full wave rectified by full wave rectifier 11 (as shown in FIG. 10(a)). This voltage is boosted and chopped by the boosting chopper circuit 31 and this voltage is supplied to load 6 (as shown in FIG. 10(b)).

Next actions for power factor improvement is explained as follows.

In circuit shown in FIG. 8, needs to be constant output voltage for acting as the stabilized power supply and needs to figure the waveforms of the input current similar with the waveform of the input voltage for improving the power factor. The inside circuit of the IC 52 acts to regulate the output voltage by only adding the reference voltage to No. 2 pin of said IC 52 and adding output voltage signal to No. 1 pin. On the other hand, in order to improve power factor, phases of No.1 pin and No.2 pin are adjusted and the waveforms of the input voltage and the output voltage are figured for being similar to each other. In the circuit designed by this invention these actions of above explained are taken place at the same time.

In order to made identical phases of input signals for inputting into No.1 pin and No.2 pin, a microscopic signal inversing against input voltage is put into No.2 pin and phase of the signal of No.1 pin are adjusted to be based on the microscopic signal.

Concretely, the voltage Roxi produced by the current i flowing in the output current detection resistor 60 (Ro) (shown in FIG. 10(h) is replaced with said microscopic signal. Then, the input voltage V (−) of No.2 pin generations waveform adding reference voltage Vref and said microscopic signal, as is shown in t he expression of below described (as shown FIG. 10(d).

$$V(-)=Vref-[R57/(R57+R59)\times(Vref+Roxi)$$

Also, input voltage V(+) of No.1 pin generates the signal where the output voltage is divided by resistors 53 and 54 and which is shown in the expression of the below. However, with only the conditions of above described, phases of V(+) and V(−) are not adjusted to each other. So, the change of the input voltage of No. 1 pin is delayed by the charging the time constant of the resistor 53 and the capacitor 55 to adjust the phases of V(+) and V(−) to each other (as shown in FIG. 10(c)). Actually, capacitance of capacitor 55 is adjusted to a delay of phase of V(+) for $3\times\pi/4$.

$$V(+)=\{R54/(R53+R54)\}\times V0$$

In FIG. 9, first noninverting error amplifier 73 detecting difference of V(+) and V(−) to amplify, however, the amplification factor of said amplifier 73 is too high, so the output voltage of said amplifier 73 is set to the proper value such as shown in FIG.10(e) by adjusting the value of the resistor 58.

The comparator 75 compares signal of said amplifier 73 (shown in FIG.10(e)) and the triangle wave signal of oscillator 79 (shown in FIG. 10 (f)) to obtain pulse signal (as shown in FIG.10(g)).

This pulse signal is transmitted from N.10 pins to the gate signal of MOSFET 25 through as transistors 70 and 71 to drive the boosting chopper circuit 31.

In this manner, the circuit designed by this invention can regulate the output and at the same time improve the power factor by using general purpose PWM control IC 52 where only waveform of the input current and the output voltage are inputted. The circuit designed by this invention shown in FIG. 8 acts also as the overcurrent protection circuit. In order that the circuit designed by the present invention acts as described above, reference voltage Vref is inputted into No.16 pin through resistor 63 and the input current of the inductor 23 is inputted into No. 15 pin through resistor 64. The second nonreverse error amplifier 74 controls pulse width of current exceeding reference voltage Vref and limits ON time of MOSFET 25. Thus, the circuit designed by this invention acts as overcurrent protection circuit.

The overcurrent action point "Iocp" is described below.

$$Iocp=\{Vref/(R62\times R60)\}\times[R64-\{R61\times(R62+R64)/(R63+R61)\}]$$

An example applying constant DC voltage circuit shown in FIG. 8 to switching power supply unit is explained as follows.

In FIG. 11, number 6 is a switching power supply. The +input side of said switching power supply 6 is connected to the one end of primary coil 87 of transformer 22 and the other end of s aid primary coil 87 is connected to −input side of said switching power supply circuit 5 through switching device 97. The gate of said switching element 97 is connected to switching regulation IC 98. The secondary coil 99 of said transformer 22 is connected to DC output terminals 104 and 105 in order through rectifier 100, rectifier 101, inductor 102 and capacitor 103. Also, error detection feedback circuit 106 is connected to output terminals 104 and 105. Moreover, the insulation device 107 such as optical isolator is inserted between feedback circuit 106 and said IC 98.

Power supply for control circuit consisting of the rectifier 109 and capacitor 110 and the power supply of said IC 98 comprising the rectifier 111 and capacitor 112 are connected to auxiliary coil 108 of the transformer 22.

The actions of said switching power supply are explained as follows.

In FIG. 11, constant DC voltage circuit improved the power factor is outputted from the DC constant voltage circuit to be supplied with the switching power supply 6. AC output is obtained at secondary coil 99 this DC voltage is supplied to primary coil 87, said AC output is rectified and smoothed, leading to obtainment of DC output voltage at output terminals 104 and 105.

In this case, when output voltage fluctuates change signal is transmitted to IC 98 through feedback circuit 106 and the insulation device 107. This IC 98 detects change signal to output the controlling signals such as pulse width modulation signal and the frequency modulation signal, the ON and OFF of the switching device 97 are controlled by said modulation signals and the switching power supply 6 outputs the stabilized and regulated voltage.

Another example of this invention is explained as follows in FIG. 12.

Figure 6:
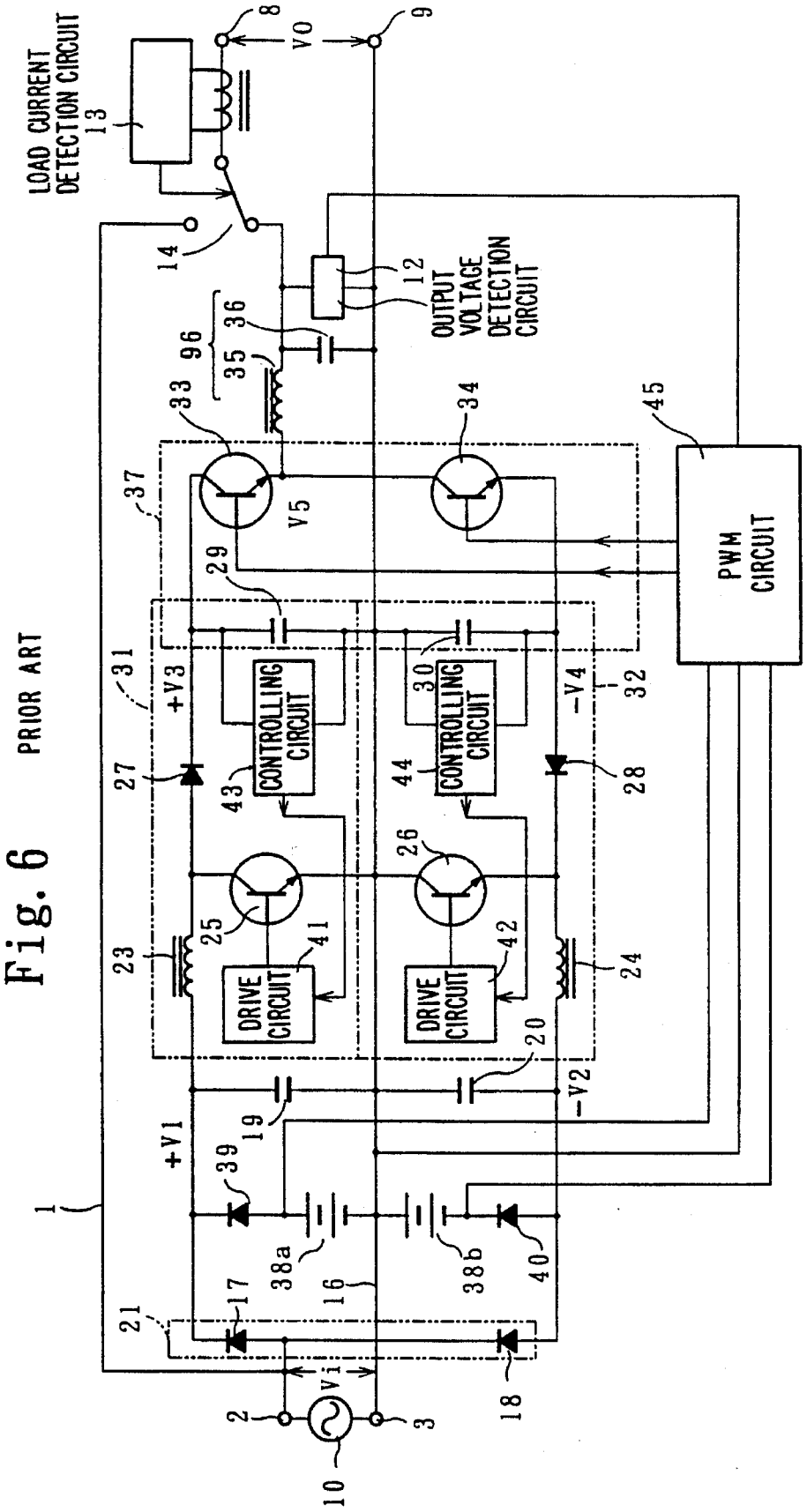
FIG. 6 is an electric circuit diagram of FIG. 5.
Figure 7A:
FIG. 7(a)-7(e) show waveforms at locations in FIG. 6 and 7.
Figure 7B:
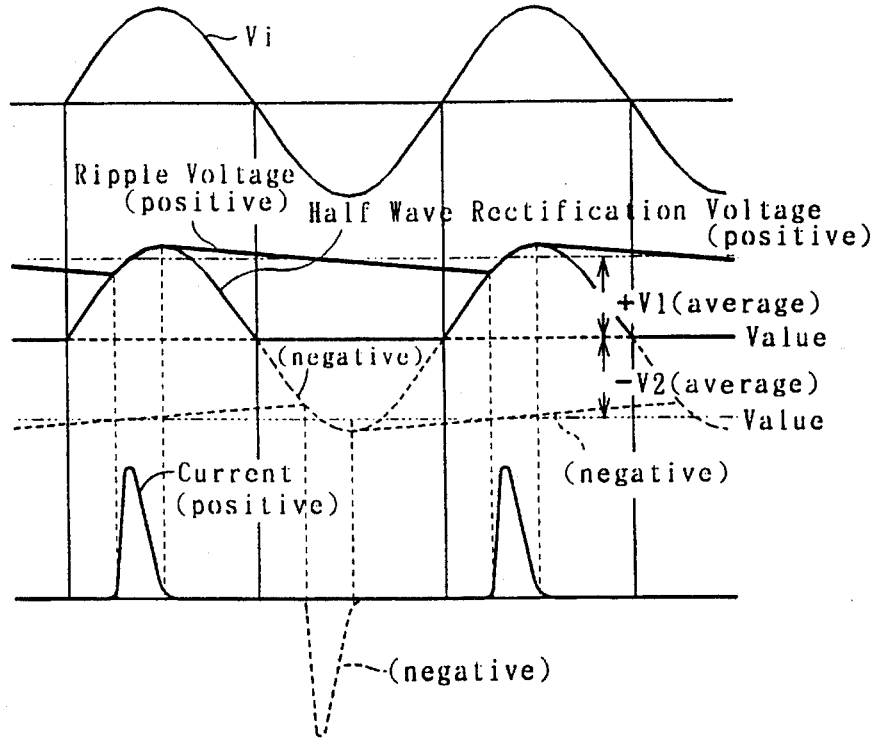
Figure 7C:
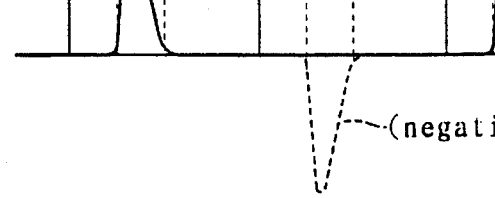
Figure 7D:
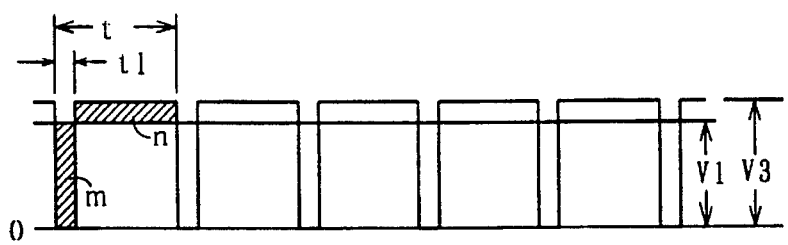
Figure 7E:
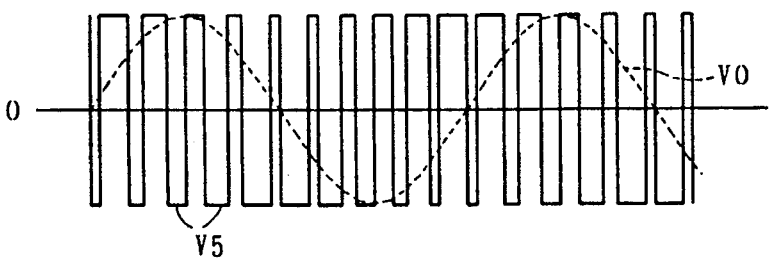
Figure 12:
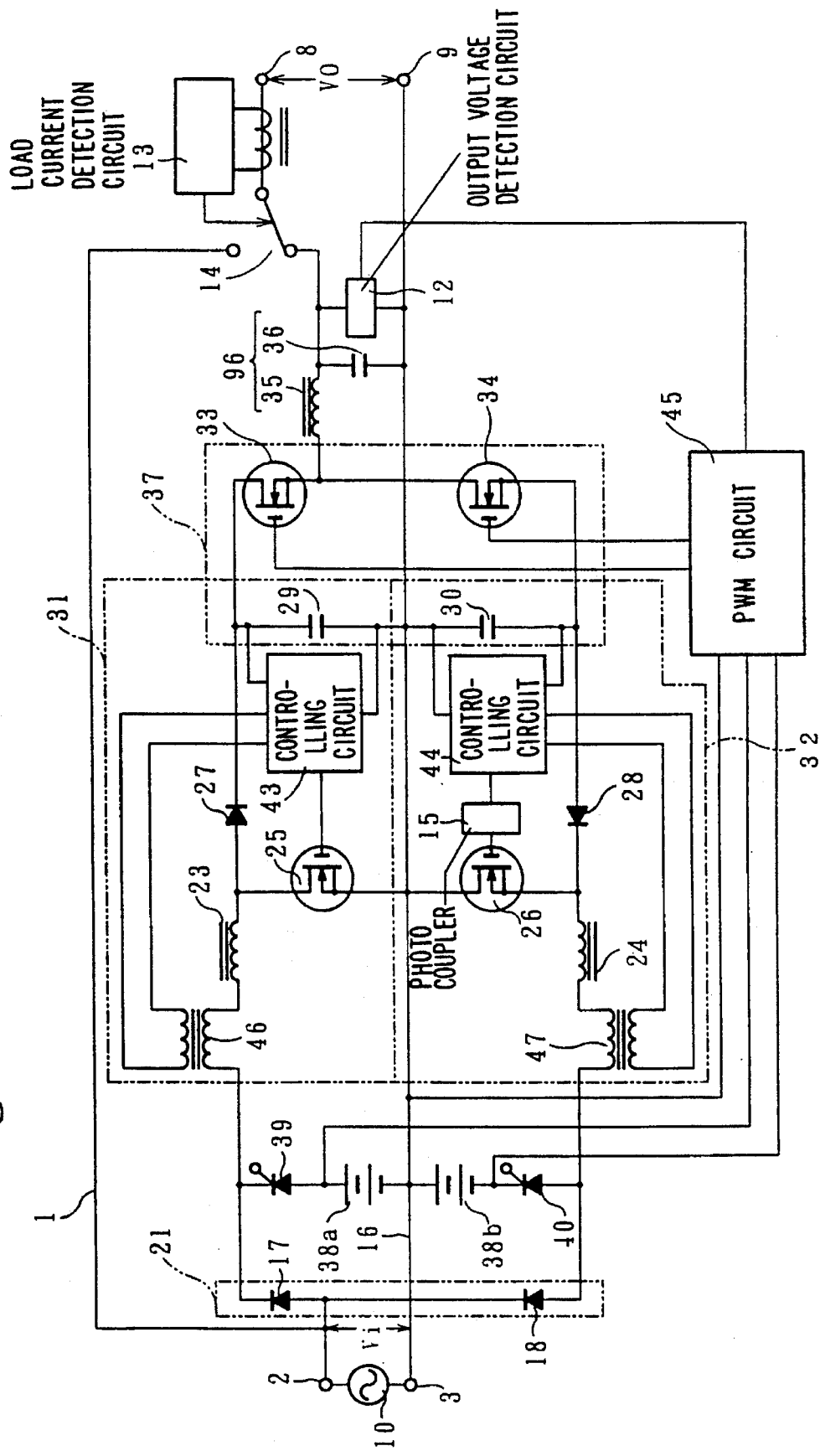
FIG. 12 is diagram of constant DC voltage circuit designed by this invention.

The circuit shown in FIG. 12 is basically the same as the circuit shown in FIG. 6, so the different points only between these circuits are explained as follows.

Current transformers 46 and 47 are connected between the voltage multiplication rectifier circuit 21 and boosting chopper circuits and 32. These current transformers 46 and 47 are designed to extract input current with insulation device. And, said boosting chopper circuits 31 and 32 are used also as filter for power factor improvement.

Figure 13:
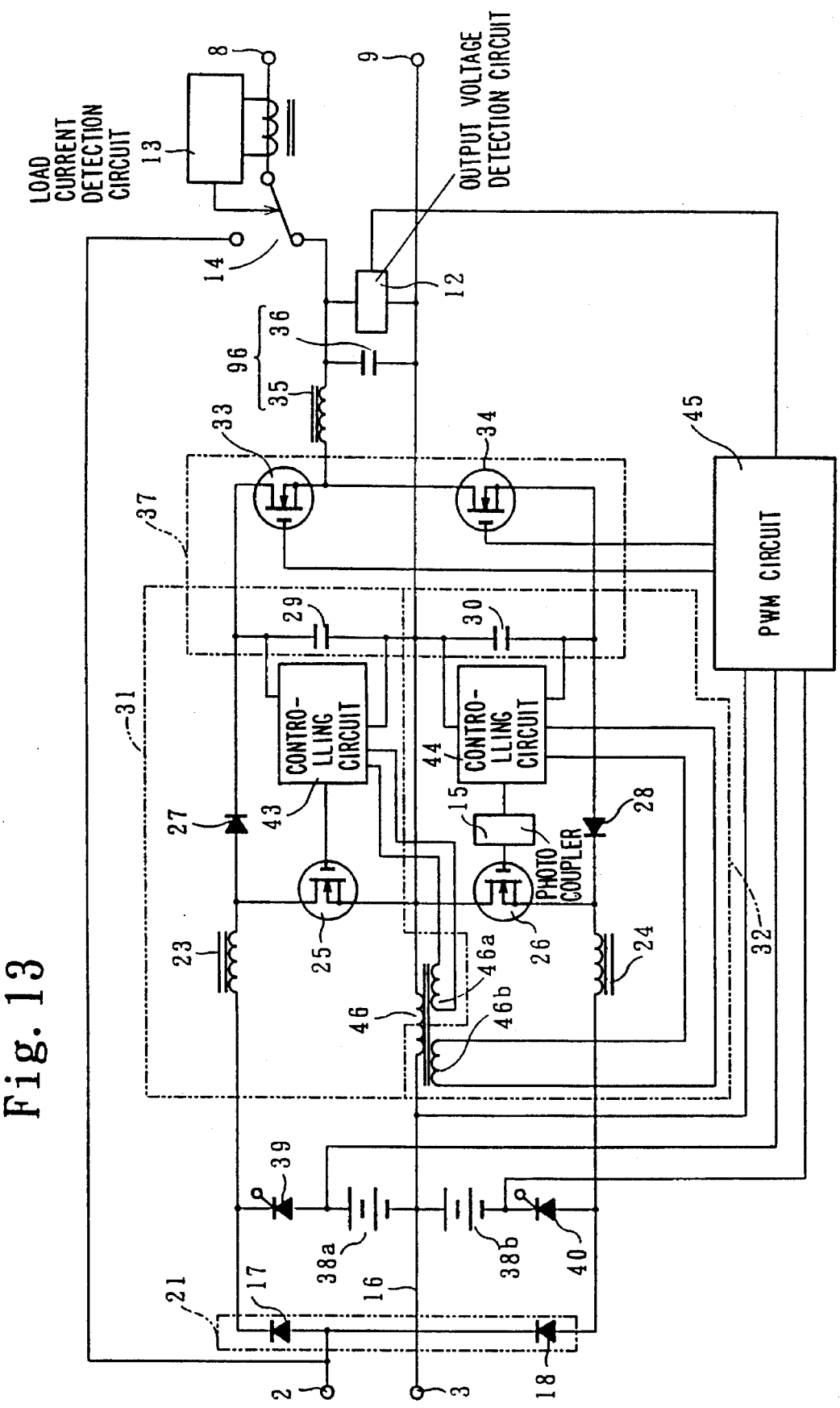
FIG. 13 is diagram showing another example of constant DC voltage circuit in which this invention is filed.

In the circuit in FIG. 12, the positive current transformers 46 and 47 are used on the positive and negative sides respectively current transformer 47 is used in the negative side. But as shown in FIG. 13, the current transformer 46 comprising two output secondary coils 46a and 46b may be inserted into common line 16.

Batteries 38a, 38b and series circuits of the reverse current breaking switching devices 39 and 40 are connected in parallel to diodes 17 and 18. The circuits in FIG. 12 and do not comprise the smoothing capacitors 19 and 20 as shown in FIG. 6. Reverse current breaking switching devices and 40 like SCR are required for breaking the discharges of batteries 38a and 38b when AC input voltage drops every commercial half wave.

Control circuits 43 and 44 becoming ON and OFF by the high frequency over 20 kHz are connected to gates of the transistors 25 and 26. Control circuit 43 on the positive side is connected directly to gate of transister 25 and control circuit 44 on the negative side is connected to transistor 26 through optical isolator 15 which is used as an insulation means.

Figure 14:
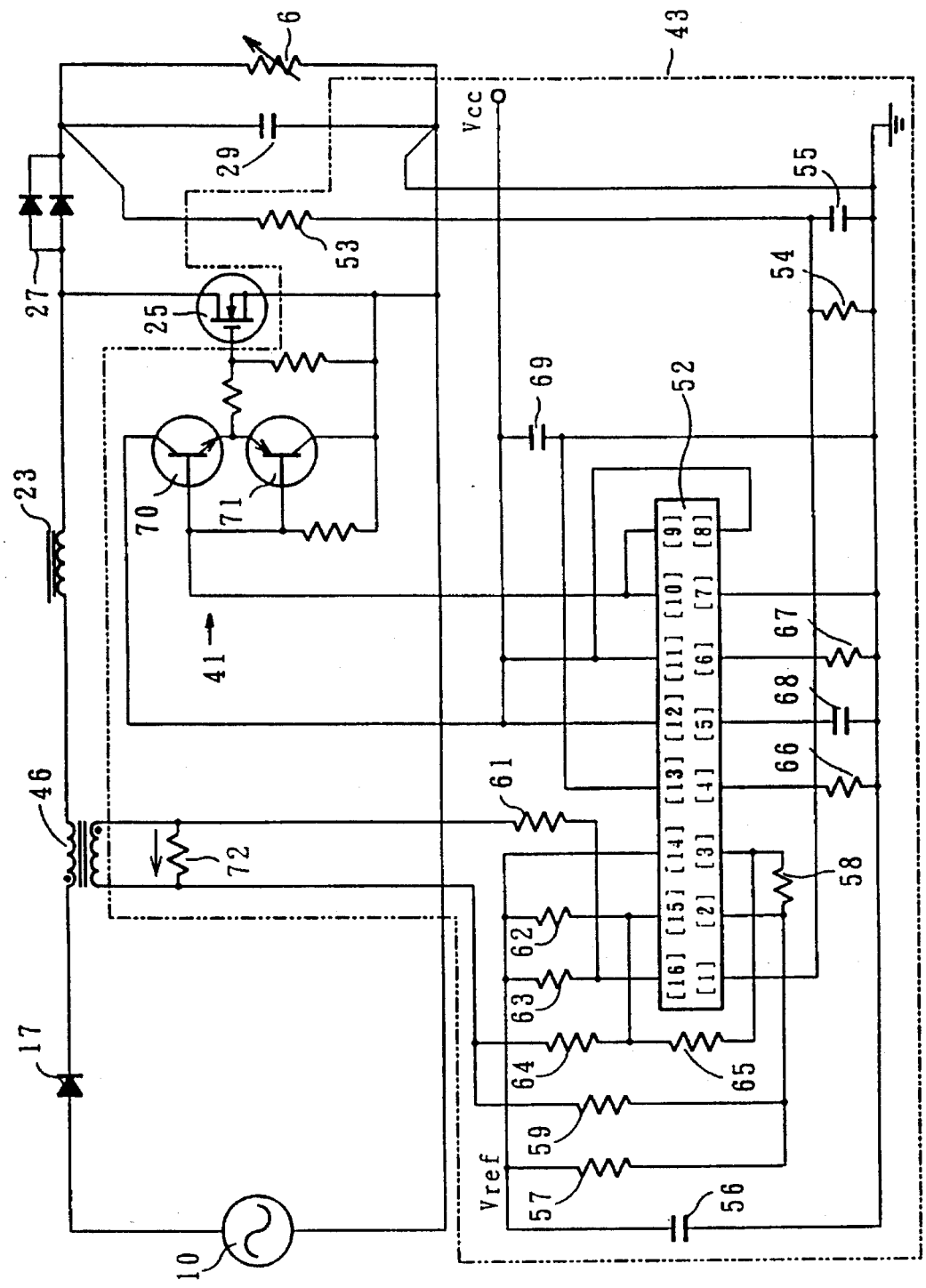
FIG. 14 is a detailed diagram illustrating only the positive side of circuit in FIG. 12.

The positive and negative sides of constant AC voltage circuit are basically the same, so, in the following, only the positive side of said circuit is explained in detail by using FIG. 14.

In order to use said boosting chopper circuit 31 as active filter for the power factor improvement, the control circuit 43 which includes general purpose PWM control IC 52 is connected to said boosting chopper circuit 31 and only input current waveform of the input current and the output voltage are inputted into said IC 52. Said IC 52 is t he same as that shown in FIG. 9.

Input current detection resistor 72 is inserted in parallel with secondary coil of said current transformer 46 and one end of said resistor 72 is connected to No. 2 pin through resistor 59.

The actions in the composition of the described above are explained as follows. AC power supply 10 is half rectified by diode 17 of the voltage multiplication rectifier circuit 21 to obtain the half rectified voltage (as shown in FIG. 15 (a)). Then, said half rectified voltage is boosted/chopped by boosting chopper circuit 31 to produce ripple voltage at both ends of capacitor 29 (as shown in FIG. 15 (b)).

By the same manners, AC voltage 10 is half rectified, boosted and chopped also on the negative side to obtain reversed voltage inversing and having the 180° of phase difference with respect to the positive side.

Said voltages on positive and negative sides are inverted into AC voltage by DC-AC inverter 37 and said AC voltage is removed of high frequency component by filter circuit 96 so that AC output having prescribed voltage and frequency is obtained.

The actions of power factor improvement are almost the same as those explained in FIG. 8 and FIG. 10. However, only difference is that microscopic signals that are inputted into No.2 pin is detected by current transformers 46 and 47.

Another explanation is that, on the positive side, primary and secondary coils of current transformer 46 are set to a specific current ratio and small current corresponding to said current ratio flows into resistor 72(as shown in FIG. 15(h)). The voltage Roxi produced by resistance value Ro of resistor 72 and current value i is inputted into No.2 pin.

Except for the different actions from those of the above described, the actions for improving power factor improvement are the same as those explained by using FIG. 8 and 10.

Since control circuit 44 is floated on the negative side, boosting chopper circuit 32 on the negative side is insulated by optical isolator 15 and connected with the gate of the switching element 26.

In this manner, in the circuits of the positive and negative sides according to common line 16, DC voltage boosted, improved the power factor and stabilized respectively by the boos ting chopper circuits 31 and 32 is obtained to be supplied with the DC-AC inverter 37 described in the following. The subsequent actions inverting the DC voltage into the AC voltage are the same as those of the circuit shown in FIG. 6.

Another embodiment of this invention is explained as follows.

Embodiments in FIG. 12 and 13 show the case that the waveform of the input current of just rectificated figures the sine wave by using a signal which the phases of the output voltages are adjusted.

Figure 16:
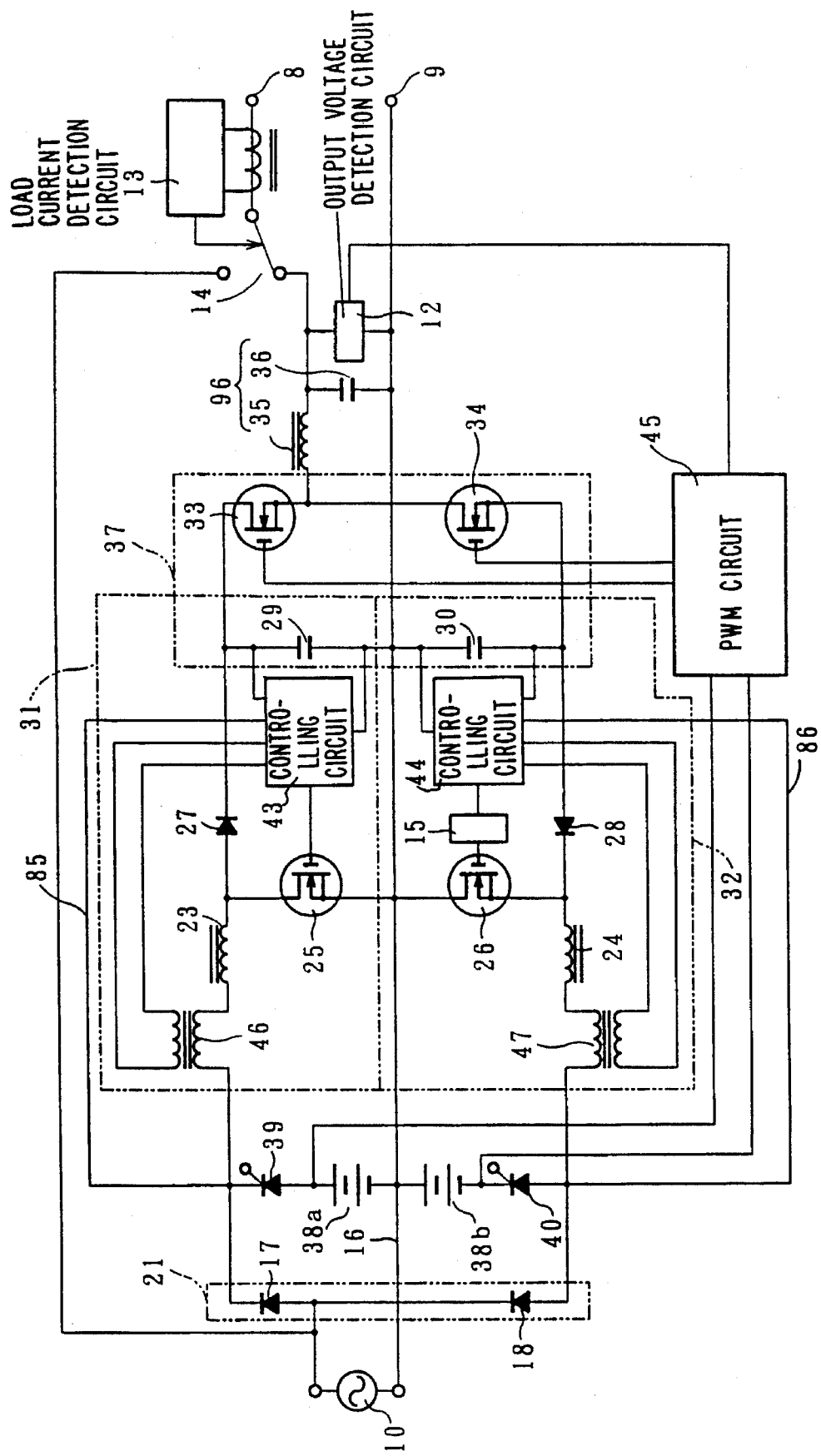
FIG. 16 is diagram showing yet another example of constant AC voltage circuit in which this invention is filed.
Figure 17:
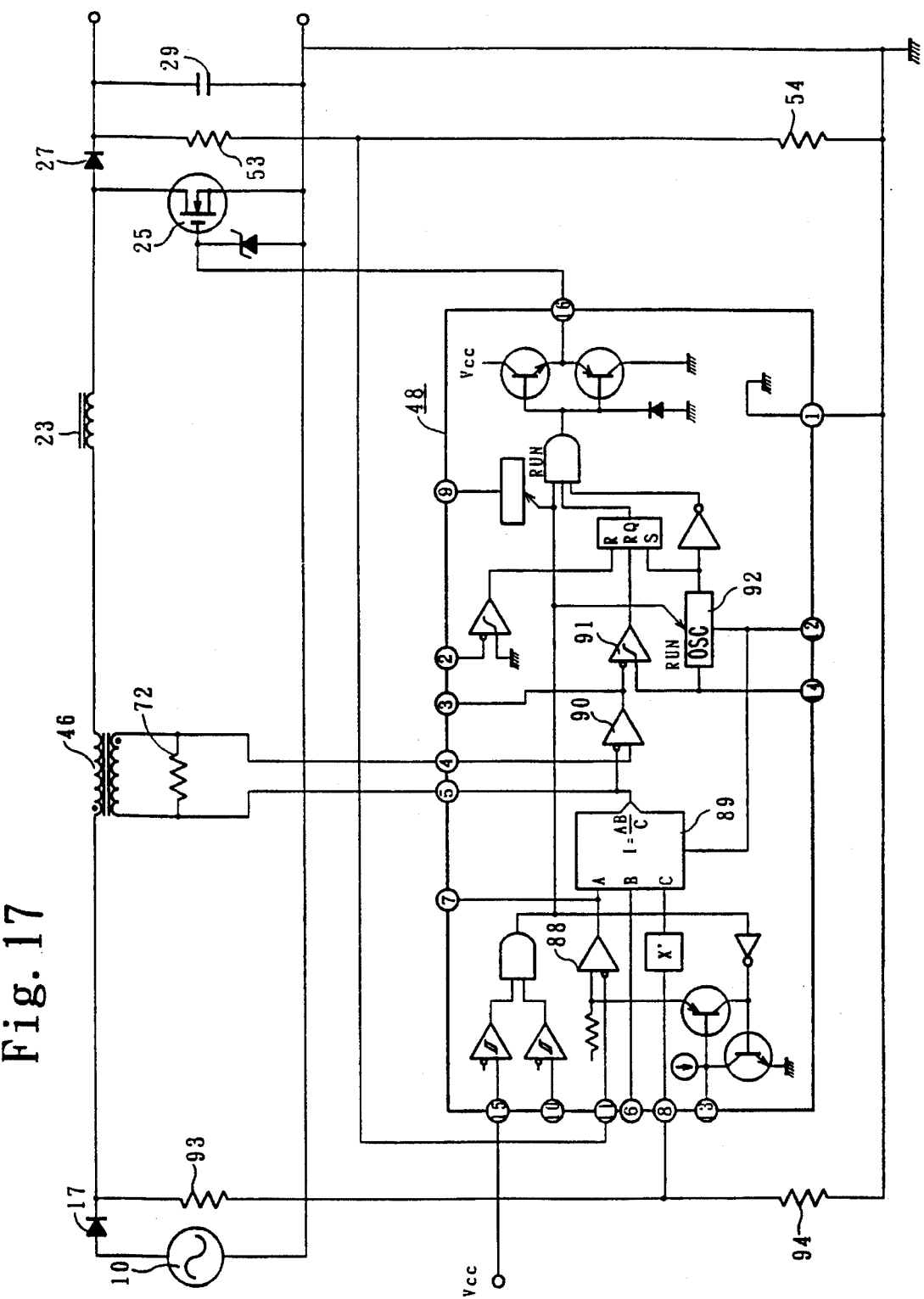
FIG. 17 is a detailed diagram illustrating only the positive side of FIG. 16.

Embodiments in FIG. 16 and 17 show a case in which waveforms of input current of just rectified figures the sine wave by using the waveform of the input voltage.

FIG. 16 shows a circuit in which applying the waveform of the input voltage of just half rectified in circuits of each positive and negative sides directly to the controlling circuits 43 and 44.

Said control circuits 43 and 44 use said general purpose PWM control IC 48. FIG. 17 shows only the positive side of constant AC voltage circuit. Input voltage is applied to pin of said IC 48. The error amplifier 88 compares the DC output voltage inputted into No. 11 pin and the specific reference voltage to amplificate. Multiplication circuit 89 multiplies output of said amplifier and input voltage of said No.8 pin. Comparator 90 operates the difference between this multiplied output and input current which is inputted into No.4 pin. In the modulation circuit 91, the output of said comparator 90 is modulated by signal of oscillator 92 to be outputted from No.16 pin and control ON/OFF of switching device 25.

In FIG. 12 and 16, when the AC power is not inputted due to the accident such as the power failure, the power is supplied from the batteries 38a and 38b by turning on the reverse current breaking switching devices 39 and 40, as is explained above.

In said embodiments, MOSFET is used as the switching devices 25, 26, 33 and 34, but another transistors such as a bipolar transistor can be replaced.

The current transformer are used as said input current detection devices 46 and 47, but a hall elements can be replaced.

In FIG. 12, 13 and 16, circuit designed by the present invention uses general purpose PWM controlling IC 48 or 52 as active filter for power factor improvement to result in the unuse of the capaciters 19 and 20 and the circuit featuring the lower price and higher reliability.

What is claimed is:

1. A DC voltage regulation circuit comprising a rectifier and a boosting chopper circuit controlled by the general purpose PWM control IC, featuring a reference voltage Vref applied to a second pin of said general purpose PWM control IC which regulates an output voltage by using PWM and the input current has the same waveform as the input voltage rectified and applied to a second pin and the phases of the voltages of the first pin and the second pin are adjusted to each other to increase a power factor of the output voltage.

2. A DC constant voltage circuit according to claim 1, wherein the second pin and the first pin serve respectively as +input and −input terminals of a noninverting error amplifier of IC and said noninverting error amplifier is connected with said boosting chopper circuit through a comparator which compares said output and a triangle wave of said amplifier.

3. A switching power supply unit using a capacitor input type constant DC voltage regulation circuit having a rectifier and a boosting chopper circuit controlled by the general purpose PWM control IC, featuring a reference voltage Vref applied to a first pin of said general purpose PWM control IC which regulates an output voltage by using PWM and the output voltage has the same waveform as the input current rectified and applied to a second pin and the phases of the voltage of the first pin and the second pin are adjusted to each other to increase a power factor of the output voltage.

4. An AC constant voltage circuit comprising:

a common line connecting the AC input and AC output terminals, positive and negative boosting chopper circuits, connected to the AC input terminal and to a DC-AC inverter, for boosting and chopping the AC input voltage, half wave rectified in each positive and negative sides, respectively, into DC voltage and the DC-AC inverter, receiving the DC voltage from the positive and negative boosting chopper circuits and inverting said DC voltage into the AC output voltage, wherein said boosting chopper circuits are used respectively as active filters for increase in power factor and to adjust the waveform and phase of input current at the input terminal to be the same as that of the waveform and phase of said AC input voltage.

5. A stabilized power supply circuit comprising:

a common line connecting the AC input and AC output terminals, positive and negative boosting chopper circuits, connected to the AC input terminal and to a DC/AC inverter, for boosting and chopping the AC input voltages, half wave rectified in both positive and negative sides, respectively, into DC voltages, and the DC/AC inverter, receiving the DC voltage from the positive and negative boosting chopper circuits and inverting said DC voltages into AC voltages, wherein said positive and negative boosting chopper circuits are used as power factor increase filters, a −input terminal of an error amplifier of an IC in each of said boosting chopper circuits is connected with an input current detection and insulation device supplying a signal according to the AC input voltage, a +input terminal of said error amplifier is connected with a circuit for adjusting the output voltage to have the same waveform as that of the rectified input voltage and adjusting the phases of said output voltage to the input voltage and an output side of said error amplifier is connected with said boosting chopper circuit through a comparator comparing the output signal and a triangle wave.

6. A stabilized power supply circuit comprising:

a common line connecting the AC input and the AC output terminals, positive and negative boosting chopper circuits, connected to the AC input terminal and to a DC-AC inverter, for boosting and chopping the AC input voltage, half rectified in both positive and negative sides, respectively, into DC voltage, and the DC-AC inverter, receiving the DC voltage from the positive and negative boosting chopper circuits and inverting said DC voltages into the AC output voltage, wherein said positive and negative boosting chopper circuits are used as power factor increase filters to adjust the waveform of the AC input current to be the same as the sine wave waveform of the input voltage.

7. A stabilized power supply circuit comprising:

a common line connecting the AC input and the AC output terminals, positive and negative boosting chopper circuits, connected to the AC input terminals and to a DC-AC inverter, for boosting and chopping the AC input voltages, half wave rectified in both positive and negative sides, respectively, into DC voltages and the DC-AC inverter, receiving the DC voltages from the positive and negative boosting chopper circuits and converting said DC voltages into AC voltages, wherein said positive and negative boosting chopper circuits are each used as a power factor increase filter, a PWM control IC for power factor improvement in said boosting chopper circuits comprising an error amplifier for amplifying DC output voltage and a reference voltage, a multiplication circuit for multiplying the output of said error amplifier and the DC input voltage, a comparator for comparing an output of said multiplication circuit and input current inputted through an input current detection and insulation device and a modulation circuit for modulating an output signal of said comparator, said modulation circuit connecting with a switching device of said boosting chopper circuits.

8. A stabilized power supply unit according to claim 5, wherein a first input current detection and insulation device is inserted in series into an inductor in the line of positive side and a second input current detection and insulation device is inserted in series in an inductor in the line of negative side.

9. A stabilized power supply unit according to claim 5, wherein an input current detection and insulation device is inserted in series into said common line and two pairs of secondary coils of said input current detection and insulation device are connected to detect input currents respectively in each of said positive and negative sides, inverted into the AC output, when the AC power is restored, to adjust the waveform of the AC input current to be the same as the sine wave waveform of the input voltage.

10. An uninterruptible stabilized power supply circuit comprising:

a common line connecting the AC input and the AC output terminals, an AC voltage rectification circuit for making the AC input voltage half wave rectified in both positive and negative sides, respectively, into DC voltages, positive and negative boosting chopper circuits, connected to said AC voltage rectification circuit and to a DC-AC inverter, for boosting and chopping said DC voltages, the DC-AC inverter, receiving the DC voltages from the positive and negative boosting chopper circuits and inverting said DC voltages into the AC voltages, and series circuits of reverse breaking switching devices and batteries connected in parallel with the positive and negative sides with respect to the common line of said AC voltage rectification circuit, each of said batteries comprising charging circuits, wherein said boosting chopper circuits are used as power factor increase active filters, when the AC power is interrupted, said reverse breaking switching devices are turned on by said boosting chopper circuits and said power factor increase active filters and the DC voltages from the batteries boosted and inverted into the AC output, when the AC power is restored to adjust the waveform of the AC input current to be the same as the sine wave waveform of the input voltage.

* * * * *